United States Patent [19]

Finn

[11] Patent Number: 4,922,720
[45] Date of Patent: May 8, 1990

[54] SOLAR LIQUID HEATING SYSTEM

[76] Inventor: Donald J. Finn, Rte. #1, Box 1200, Jackson, S.C. 29831

[21] Appl. No.: 120,085

[22] Filed: Nov. 12, 1987

[51] Int. Cl.⁵ .............................................. F03G 7/02
[52] U.S. Cl. ................................. 60/641.8; 126/415; 126/426
[58] Field of Search ............... 126/415, 416, 417, 426, 126/436, 441, 450; 60/641.8, 651, 659, 671, 648

[56] References Cited

U.S. PATENT DOCUMENTS 4,241,724 12/1980 Hull .................................. 126/436 X
4,719,759 1/1988 Zaslavsky ........................... 60/641.8

*Primary Examiner*—Stephen F. Husar
*Attorney, Agent, or Firm*—Hiram A. Sturges

[57] ABSTRACT

A solar heating system for heating fluid enclosed in a waterproof, heatable flexible bag held in a support which can be a cavity in the earth, insulated from ambient temperatures by alternate layers of transparent flexible gas bags and liquid bags disposed above the heatable bag. An upper weight bag filled with liquid applies weight down against the heatable bag to apply pressure on it to raise the boiling point of the liquid therein. A heat exchanger receives hot fluid from the heatable bag to produce hot gas such as hot freon under pressure to operate a turbine. The turbine can deliver electricity for electrical power for producing hydrogen and oxygen gases, for heating and for other uses including electrical power for municipalities.

10 Claims, 2 Drawing Sheets

SOLAR LIQUID HEATING SYSTEM

BACKGROUND

In the past air has been often used as an insulator, and water, which is much more dense than air, has been used for the storage of heat in solar heating systems.

However, it is object to this invention to provide the concept of having a heatable bag of flexible transparent material filled with water or other fluid disposed in the sunlight to entrap heat from the sun to operate a turbine. The ambient temperatures in the out-of-doors are never very high so one of the ways this is made practical is to use the hot fluid to heat freon, for example, in a heat exchanger so as to use hot gaseous freon to drive a turbine and make electrical power.

Another way this is made practical is to insulate the bag of heated fluid with a bag of insulating air above it and then to further impede the loss of heat to the atmosphere from the heatable bag by placing a layer of water above the layer of air, the water being also in a bag. Further insulation is achieved by placing a layer of air in a air-bag above the insulating water layer. The number of alternating air bags and water bags can be compounded to achieve whatever resistance to heat loss from the heatable bag is necessary.

It is an object to provide a strong support for the bag system by providing an earth embankment around all sides of the bag system.

Rainfall into the bag system would create a problem and this is taken care of herein by covering the entire system with a layer of waterproof thermosplastic material of transparent nature. The covering is also extended down over the embankment so the embankment can stay dry whereby the earth therein makes better insulation.

Simular layers of insulation bags can be used under the heatable bag to prevent heat loss downward.

A problem arises as regards causing an air bag to hold a desired shape. And so it is an object hereof to provide the concept of securing the perimeter of each air bag to the perimeter of the water bag therebeneath. Since gravity causes the water bag to hold a level shape, then the securing to the air bag establishes the position of the underside of the air bag thereabove.

An object hereof is to provide a system capable of delivering gas for driving a turbine system to provide the electricity for a large metropolis. Many square miles covered with many such flexible bag systems and located in a relatively sunny part of the country, such as Arizona, could economically deliver electricity to New York City, for example.

A problem arises when a long sequence of cloudy days occurs but delivering hot fluid from the heatable bag into the heat exchanger makes a practical way to run a turbine by the hot gas, such as freon, from the heat exchanger, because of the stored heat.

The problem of calcium deposits clogging the surfaces of the fluid bags, when water is used, is taken care of by using soft water therein.

DESCRIPTION OF PREFERRED EMBODIMENT

Figure 1:
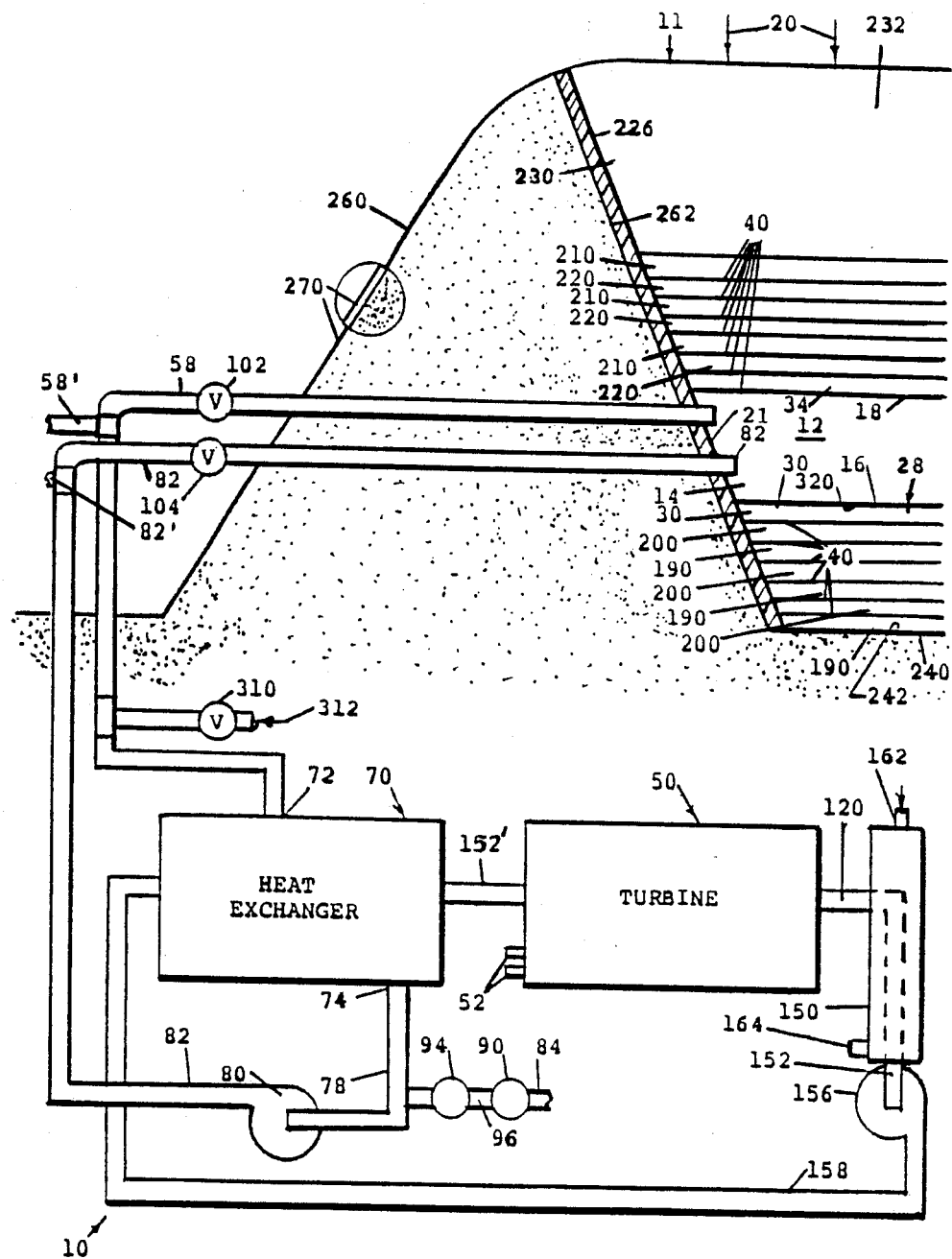
FIG. 1 is a diagrammatic sectional view taken along the line of 1—1 of FIG. 2 and showing cross section of an embankment and adjacent position of solar liquid heating system, hereof.

The solar heating system of the invention is generally indicated at 10, FIG. 1, and is for heating liquid, such as water, 12 disposed in a heatable bag 14.

The bag 14 is made of flexible thermo-plastic that is preferably transparent with the capability of receiving sunlight therethrough coming from above as indicated by the arrows 20.

The bag 14 has a bottom wall 16, a top wall 18, and end wall 21, and it completely encloses the body of liquid 12. The right hand wall, is not shown but is identical to the left hand wall 21.

The bag 14 is supported on the level upper surface 28 of an insulating gas or air bag 30 whereby the upper surface of the air bag 30 can also be called a support means 28 because it supports the underside of the heatable bag 14 which will usually be filled with air.

A gas bag 34 is disposed above the heatable bag 14 and is for insulating its upper side, and so it can be called a topside insulation bag 14.

The periphery dimension of the gas insulation bag 34 is much greater than the vertical height thereof, and this is true of all bags mentioned herein. All bags are also substantially gasproof and waterproof and also being flexible whereby the gravity pull on the bags and the flexibility thereof causes the upper sides of the bags to seek horizontal levels.

All bags hereof are made of thermoplastic material of a type not substantially deterioratable for the purposes hereof by the ultraviolet rays of sun.

Each liquid-containing bag hereof, and any gas bag disposed directly above it are disposed against each other, the perimeters of each gas bag and of the liquid-containing bag adjacent thereto and beneath thereof are sufficiently attached together whereby the respective gas bag lays substantially flat because it is stretched flat by the liquid bag therebeneath which latter is stretched flat on its top side by gravity itself, such attachment preferably extends along the majority of the length of the perimeters of the attached bags as at 40.

The solar liquid heating system 10 has a turbine 50 producing electricity delivered at the terminals 52. A way of powering the turbine 50 is provided by using gas, such as freon, in a heat exchanger 70 heated by hot liquid passing from said heatable bag through a hot liquid outlet.

The exchanger 70 has a hot water inlet 72 and a cooler water outlet 74 which delivers to a return pipe 78 which delivers to a pump 80 for pumping it back through a pipe 82 into the heatable bag 14. Water from the outlet 78 can also be delivered to an exit 84 by a pump 90 in a line 96, when a valve 94 in the line 96 is opened. The outlet line 58 and the return line 82 each have a valve in them at 102 and 104 respectively. Hot freon gas leaves the exchanger 70 in a pipe 152 to the turbine 50. Cooler freon leaves the turbine 50 in a pipe 120, entering a heat exchanger 150.

The freon outlet pipe 152 of the freon cooling heat exchanger 150 leads to a pump 156 which propels freon through a freon return line 158 to the freon heating heat exchanger 70.

The freon cooling heat exchanger 150 has an inlet 162, and an outlet 164 for cooling water from a source not shown.

A first underbag 30 for insulation and containing gas, such as air 182, is provided and defines a first underside gas bag 30 and is disposed below and supporting and adjacent said heatable bag and insulating it.

Other gas underbags 190 can be below and supporting the first underbag 30 and each are held spaced apart by a different one of many liquid containing underbags 200 having liquid therein.

Above the first gas upper bag 34 are many other gas upper bags 210, each also containing a gas, such as air or nitrogen. And between each pair of gas upper bags is a liquid containing upper bag 220. bag lays substantially flat because it is stretched flat by the liquid bag therebeneath which latter is stretched flat on its top side by gravity itself, such attachment preferably extends along the majority of the length of the perimeters of the attached bags.

The solar liquid heating system 10 has a turbine 50 producing electricity delivered at the terminals 52. A way of powering the turbine 50 is provided by using gas, such as freon, in a heat exchanger 70 heated by hot liquid passing from said heatable bag through a hot liquid outlet.

A hot water inlet 72 of the exchanger 70 to a cooler water outlet 74 of the exchanger 70 delivers to a return pipe 78 which delivers to a pump 80 for pumping it back through a pipe 82 into the heatable bag 14. Water from the outlet 78 can also be delivered to an exit 84 by a pump 90 in a line 96, when a valve 94 in the line 96 is opened. The outlet line 58 and the return line 82 each have a valve in them at 102 and 104 respectively. Hot freon gas leaves the exchanger 70 in a pipe 152' to the turbine 50. Cooler freon leaves the turbine 50 in a pipe 120, entering a heat exchanger 150.

The freon outlet pipe 152 of the freon cooling heat exchanger 150 leads to a pump 156 which propells freon through a freon return line 158 to the freon heating heat exchanger 70.

The freon cooling heat exchanger 150 has an inlet 162, and an outlet 164 for cooling water from a source not shown.

Figure 2:
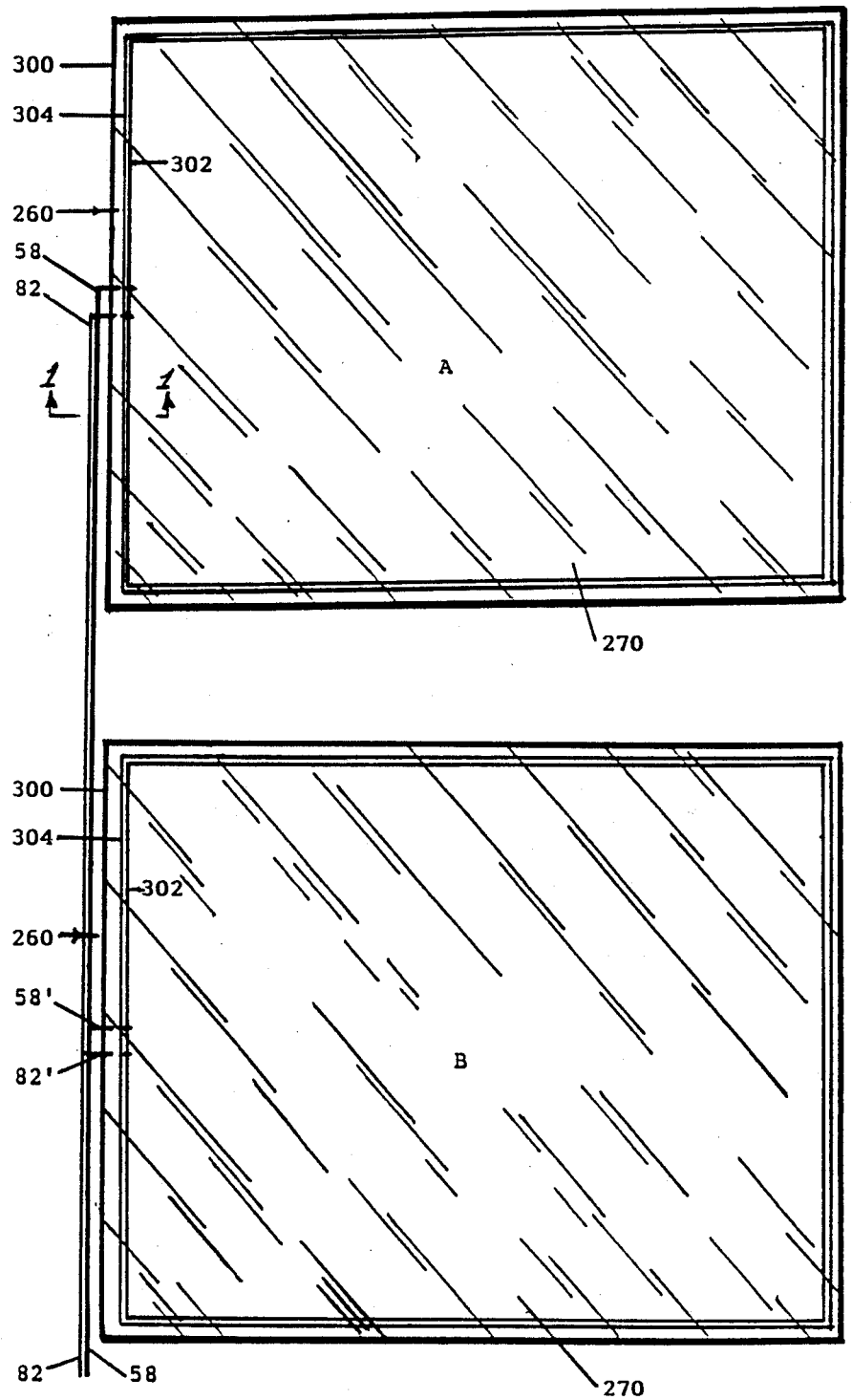
In FIG. 2 are shown a pair of solar heaters identical to the solar heater of FIG. 1 and representative of multiple units of any number perhaps covering hundreds of acres.

The solar heaters of FIG. 2 show the top covers 260 and, in full lines since the covers 270 are transparent, the outer edges 300, inner edges 302 and crests 304 of the embankments 260 surrounding each earth-cavity, but do show the outlet pipe 58 and the inlet pipe 82 of one solar heater A and the outlet pipe 58' and the inlet pipe 82', of the other solar heater B.

In FIG. 1, at it's left side, one can see the pipes 58, and 82, and how they connect to the pipes 58 and 82.

A refilling inlet pipe 312 leads to the pipe 58 so that replacement fluid can be put into the heatable bag 14 through a valve 310 in the pipe 58.

The underside of the heatable bag 14 is coated with a black coating 320 to absorb sunlight.

I claim:

1. A solar heater for heating liquids comprising a heatable bag, a support means supporting said heatable bag , a heatable body of liquid in said heatable bag, said heatable bag being disposed in sunlight so as to become heated thereby, a topside gas bag above said heatable bag, said topside gas bag containing a gas for serving as insulation, a topside fluid bag disposed above said topside gas bag and containing a fluid for further insulation, said bags being substantially gasproof and waterproof and also being flexible whereby the gravity pull on said bags and the flexibility thereof causes the upper sides of said bags to seek horizontal levels, said bags each having a periphery dimension much greater than its maximum vertical height, an inlet to said heatable bag for admitting a liquid thereinto, said heatable bag having an outlet through which hot liquid can be removed, the upper side of said heatable bag and the upper and lower sides of said insulation bags being capable of permitting sunlight to pass therethrough.

2. The solar liquid heater of claim 1 said bags are made of thermoplastic material of a type not substantially deterioratable for the purposes hereof by the ultraviolet rays of sun.

3. The solar liquid heater of claim 1 wherein said liquid-containing bag and the gas bag directly above it are disposed against each other and define a set of insulation bags, the perimeters of the bags of said set being sufficiently attached together whereby the gas bag thereof lays substantially flat because it is stretched flat by the liquid bag therebeneath which latter is itself stretched flat on its top side by gravity.

4. The solar liquid heater of claim 3 wherein said attachment extends along the majority of the length of the perimeters of the bags of said set.

5. The solar liquid heater of claim 1 having a turbine producing electricity, means for powering said turbine by using gasses heated by heat from hot liquid passing from said heatable bag through said outlet.

6. The solar liquid heater of claim 5 having means delivering liquid that has come from said heatable bag back into said heatable bag after heat has been removed from it.

7. The solar liquid heater of claim 1 having a turbine producing electricity, a heat exchanger system receiving heat from hot liquid moving from said outlet, said heat exchanger system delivering to said turbine hot gas that has passed through said heat exchange and has received heat from the liquid that has been heated by the sun.

8. The solar liquid heater of claim 1 wherein an underbag for insulation and containing gas is provided and defines an underside gas bag and is disposed below said heatable bag and insulating it.

9. The solar liquid heater of claim 1 having said support means being at least partly defined by a cavity in the earth.

10. The solar liquid heater of claim 1 having a liquid-containing weight bag disposed above said other bags, said weight bag applying gravity pressure on bags therebeneath which serves to raise the boiling point of liquid in said heatable bag so that said heatable bag can deliver hotter liquid at said outlet.

* * * * *